United States Patent
Zheng et al.

(10) Patent No.: US 12,231,717 B1
(45) Date of Patent: Feb. 18, 2025

(54) METHOD, APPARATUS, DEVICE AND MEDIUM FOR VIDEO EDITING

(71) Applicant: Beijing Zitiao Network Technology Co., Ltd., Beijing (CN)

(72) Inventors: Haowen Zheng, Beijing (CN); Xiangrui Zeng, Beijing (CN); Fan Wu, Beijing (CN); Qizhi Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/622,734

(22) Filed: Mar. 29, 2024

Related U.S. Application Data (63) Continuation of application No. PCT/CN2023/136893, filed on Dec. 6, 2023.

(30) Foreign Application Priority Data

Jul. 26, 2023 (CN) .......................... 202310928336.3

(51) Int. Cl.
H04N 7/173 (2011.01)
H04N 21/234 (2011.01)
H04N 21/431 (2011.01)

(52) U.S. Cl.
CPC .................... H04N 21/4318 (2013.01); H04N 21/23424 (2013.01)

(58) Field of Classification Search
CPC ...................... H04N 21/4318; H04N 21/23424
(Continued)

(56) References Cited

U.S. PATENT DOCUMENTS

| 9,583,140 | B1 * | 2/2017 | Rady | ................. H04N 21/44004 |
| 11,495,265 | B1 * | 11/2022 | Balko | ................. G11B 27/036 |

(Continued)

FOREIGN PATENT DOCUMENTS

| CN | 112584061 A | 3/2021 |
| CN | 112911388 A | 6/2021 |

(Continued)

OTHER PUBLICATIONS

International Patent Application No. PCT/CN2023/136893; Int'l Search Report; dated Apr. 15, 2024; 2 pages.

*Primary Examiner* — Jefferey F Harold
*Assistant Examiner* — Sahar Aqil Riaz
(74) *Attorney, Agent, or Firm* — BakerHostetler (57) ABSTRACT

A method for video editing comprises: presenting a template publishing interface based on a target video draft; the template publishing interface comprises an edit track area, the edit track area comprises a plurality of edit tracks, and material track segments formed based on at least part of a material of the target video draft are presented on the plurality of edit tracks; the target video draft comprises a material and edit information, the edit information indicates an edit operation on the material; determining a replaceable material in the target video draft in response to a setting operation on a first target track segment in the material track segments; generating a target video template based on the target video draft and the replaceable material; the target video template is used to achieve a video editing effect of replacing a replaceable material with a filled material based on the target video draft.

20 Claims, 3 Drawing Sheets

(58) Field of Classification Search
USPC .......................................................... 725/116
See application file for complete search history.

(56) References Cited

U.S. PATENT DOCUMENTS

| | | | | |
|---|---|---|---|---|
| 2009/0087161 | A1* | 4/2009 | Roberts | H04N 5/262 |
| | | | | 386/285 |
| 2009/0092374 | A1* | 4/2009 | Kulas | H04N 21/6125 |
| | | | | 386/282 |
| 2010/0154065 | A1* | 6/2010 | Cohen | G11B 27/036 |
| | | | | 726/28 |
| 2010/0220197 | A1 | 9/2010 | Dukellis et al. | |
| 2010/0281375 | A1* | 11/2010 | Pendergast | G11B 27/036 |
| | | | | 715/723 |
| 2010/0325547 | A1* | 12/2010 | Keng | G11B 27/034 |
| | | | | 715/838 |
| 2013/0216206 | A1* | 8/2013 | Dubin | G11B 27/031 |
| | | | | 386/282 |
| 2017/0162228 | A1* | 6/2017 | Chou | G11B 27/34 |
| 2019/0373322 | A1* | 12/2019 | Rojas-Echenique | G06N 3/045 |
| 2020/0380060 | A1* | 12/2020 | Siani Cohen | G06N 3/08 |
| 2022/0415361 | A1* | 12/2022 | Wang | G11B 27/031 |
| 2023/0144094 | A1* | 5/2023 | Wu | G06F 40/186 |
| | | | | 386/278 |
| 2023/0259253 | A1* | 8/2023 | Kang | H04N 21/440236 |
| 2024/0013808 | A1* | 1/2024 | Liu | H04N 21/47205 |
| 2024/0112387 | A1* | 4/2024 | Zheng | G06T 11/60 |
| 2024/0114216 | A1* | 4/2024 | Wang | H04N 21/816 |
| 2024/0121469 | A1* | 4/2024 | Cao | H04N 21/4884 |
| 2024/0127863 | A1* | 4/2024 | Huang | H04N 21/8456 |
| 2024/0153537 | A1* | 5/2024 | Jia | G11B 27/036 |
| 2024/0170025 | A1* | 5/2024 | Wang | G11B 27/031 |
| 2024/0331734 | A1* | 10/2024 | Zhang | G11B 27/036 |

FOREIGN PATENT DOCUMENTS

| | | |
|---|---|---|
| CN | 116156077 A | 5/2023 |
| WO | WO 2017/106960 A1 | 6/2017 |

\* cited by examiner

METHOD, APPARATUS, DEVICE AND MEDIUM FOR VIDEO EDITING

This application is a continuation of International Patent Application No. PCT/CN2023/136893, filed on Dec. 6, 2023, which claims priority to Chinese Application No. 202310928336.3, entitled "METHOD, APPARATUS, DEVICE AND MEDIUM FOR VIDEO EDITING" and filed on Jul. 26, 2023, the disclosures of which are incorporated herein by reference in their entities.

FIELD

The present disclosure relates to the technical field of multimedia, and more particularly, to a method, apparatus, device and medium for video editing.

BACKGROUND

In order to enable users to clip videos conveniently and quickly, some video clipping software or websites can provide users with video templates. In many cases, video templates are created and published by template creators. However, the inventor has found through research that in the related art, it is inconvenient for the template creators to generate templates and the efficiency of template generation is low.

SUMMARY

To solve or at least partly solve the above technical problems, the present disclosure provides a method, apparatus, device and medium for video editing.

An embodiment of the present disclosure provides a method for video editing, the method comprising: presenting a template publishing interface based on a target video draft; wherein the template publishing interface comprises an edit track area, the edit track area comprises a plurality of edit tracks, and material track segments formed based on at least part of a material of the target video draft are presented on the plurality of edit tracks; the target video draft comprises a material and edit information, the edit information indicates an edit operation on the material; determining a replaceable material in the target video draft in response to a setting operation on a first target track segment in the material track segments; generating a target video template based on the target video draft and the replaceable material; wherein the target video template is used to achieve a video editing effect of replacing a replaceable material with a filled material based on the target video draft.

Optionally, a state identifier control is provided on the material track segment; the determining a replaceable material in the target video draft in response to a setting operation on a first target track segment in the material track segments comprises: in response to a trigger operation on a state identification control on a first target track segment in the material track segments, determining a current state of a state identification control on each of the material track segments, the current state comprising a replaceable state or non-replaceable state; determining a replaceable material in the target video draft based on a second target track segment corresponding to a state identification control that is currently in a replaceable state.

Optionally, the method further comprises: where it is detected that a third target track segment in the material track segments slides along a time axis, adjusting a position of a state identification control corresponding to the third target track segment, so that the state identification control corresponding to the third target track segment is located within a window corresponding to the third target track segment.

Optionally, the determining a current state of a state identification control on each of the material track segments in response to a trigger operation on a state identification control on a first target track segment in the material track segments comprises: in response to a trigger operation on a state identification control on a first target track segment in the material track segments, determining a current state of a state identification control on each of the material track segments based on a state of the state identification control on the first target track segment before the trigger operation; wherein the current state of the state identification control on the first target track segment is different from the state of the state identification control on the first target track segment before the trigger operation, and a current state of a state identification control on a non-first target track segment in the material track segments is the same as a state of the state identification control on the non-first target track segment before the trigger operation.

Optionally, the determining a current state of a state identification control on each of the material track segments in response to a trigger operation on a state identification control on a first target track segment in the material track segments comprises: in response to a multi-selection operation on the material track segments, determining a plurality of selected track segments corresponding to the multi-selection operation from the material track segments; in response to a trigger operation on a state identification control on a first target track segment in the plurality of selected track segments, determining a current state of a state identification control on each of the material track segments; wherein the current state of the state identification control corresponding to each of the plurality of selected track segments remains consistent, and is different from a state of a state identification control on the first target track segment before the trigger operation; a current state of a state identification control on a non-selected track segment in the material track segments is the same as a state of the state identification control on the non-selected target track segment before the trigger operation.

Optionally, the step of presenting a template publishing interface based on a target video draft comprises: in response to a trigger operation on a publishing control on a draft edit interface, determining whether a target video draft meets a preset publishing condition or not; if yes, presenting a template publishing interface based on the target video draft.

Optionally, the publishing condition comprises one or more of the following conditions: all materials in the target video draft have been downloaded, all algorithms involved in the target video draft have been calculated, none of materials in the target video draft has been lost or damaged, a main track corresponding to the target video draft is not empty, and the target video draft does not contain a specified content.

Optionally, the generating a target video template based on the target video draft and the replaceable material comprises: performing a target operation on a replaceable material in the target video draft to obtain a target video template based on the target video draft after the target operation is performed; wherein the target operation comprises: a delete operation or an adding operation of replaceable identifier.

Optionally, the method further comprises: publishing the target video template in response to receiving a publishing confirmation instruction for the target video template from a user.

An embodiment of the present disclosure further provides an apparatus for video editing, comprising: a publishing interface presenting module, for presenting a template publishing interface based on a target video draft; wherein the template publishing interface comprises an edit track area, the edit track area comprises a plurality of edit tracks, and material track segments formed based on at least part of a material of the target video draft are presented on the plurality of edit tracks; the target video draft comprises a material and edit operation information corresponding to the material; a replaceable material determining module, for determining a replaceable material in the target video draft in response to a setting operation on a first target track segment in the material track segments; a template generating module, for generating a target video template based on the target video draft and the replaceable material; wherein the target video template is used to achieve a video editing effect of replacing a replaceable material with a filled material based on the target video draft.

An embodiment of the present disclosure further provides an electronic device, the electronic device comprising: storage means having a computer program stored thereon; processing means for executing the computer program in the storage means to perform the steps of the method for video editing.

An embodiment of the present disclosure further provides a computer-readable storage medium, with a computer program stored thereon, the computer program for performing a method for video editing as provided in the embodiments of the present disclosure.

The above-described solution provided by the embodiments of the present disclosure can present a template publishing interface based on a target video draft, the template publishing interface comprising an edit track area, the edit track area comprising a plurality of edit tracks, material track segments formed based on at least part of a material of the target video draft being presented on the plurality of edit tracks; based thereon, can further determine a replaceable material in the target video draft in response to a setting operation on a first target track segment in the material track segments, so that a target video template can be generated based on the target video draft and the replaceable material. In this way, a template publishing interface that is more convenient for operation is provided for users, and they can directly set replaceable materials based on a material track segment on a plurality of edit tracks, which is convenient and fast. Thereby, the efficiency of template generation can be better improved.

It would be appreciated that the content described in the Summary section is neither intended to identify key or essential features of the embodiments of the present disclosure, nor is it intended to limit the scope of the present disclosure. Other features of the present disclosure will be readily envisaged through the following description.

BRIEF DESCRIPTION OF THE DRAWINGS

The drawings herein are incorporated in and constitute a part of this specification, which illustrate embodiments conforming to the present disclosure and serve to explain the principles of the present disclosure together with the specification.

In order to illustrate more clearly the technical solutions in the embodiments of the present disclosure or the prior art, a brief introduction is presented below to the drawings to be used in the description of the embodiments or the prior art. Obviously, for those of ordinary skill in the art, they may further obtain other drawings from these drawings without the exercise of any inventive skill.

DETAILED DESCRIPTION

In order to better understand the above objects, features, and advantages of the present disclosure, a further description is presented below to the solution of the present disclosure. It is noteworthy that the embodiments of the present disclosure and the features therein can be combined with each other without conflict.

Many specific details are set forth in the following description in order to fully understand the present disclosure, but the present disclosure may also be implemented in other ways than those described herein. Obviously, the embodiments in the specification are only part of the embodiments of the present disclosure, not all embodiments.

In the related art, it is rather inconvenient for template creators to generate templates. For example, most existing video clipping software makes it more cumbersome and complex for creators to choose replaceable materials. Creators find it difficult to conveniently obtain the materials involved in the template and quickly select replaceable materials therefrom. Therefore, in the process of selecting replaceable materials, more time and energy are usually wasted, and the efficiency of template generation is low, which also leads to lower efficiency of template publishing. To improve the above problems, the embodiments of the present disclosure provide a method, apparatus, device and medium for video editing, which are described in detail below.

Figure 1:
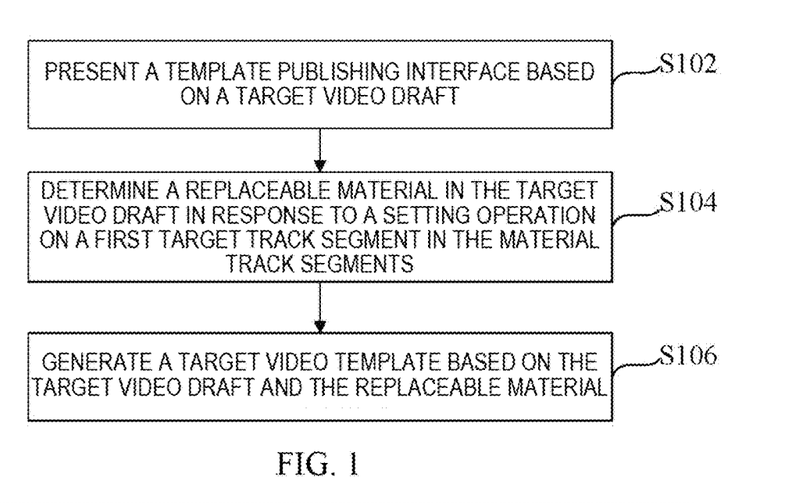
FIG. 1 is a schematic flowchart of a method for video editing provided by an embodiment of the present disclosure.

FIG. 1 is a schematic flowchart of a method for video editing provided by an embodiment of the present disclosure. The method can be performed by an apparatus for video editing, which can be implemented in software and/or hardware and can generally be integrated into an electronic device. As shown in FIG. 1, the method mainly comprises the following steps S102 to S106:

Step S102: presenting a template publishing interface based on a target video draft.

Figure 2:
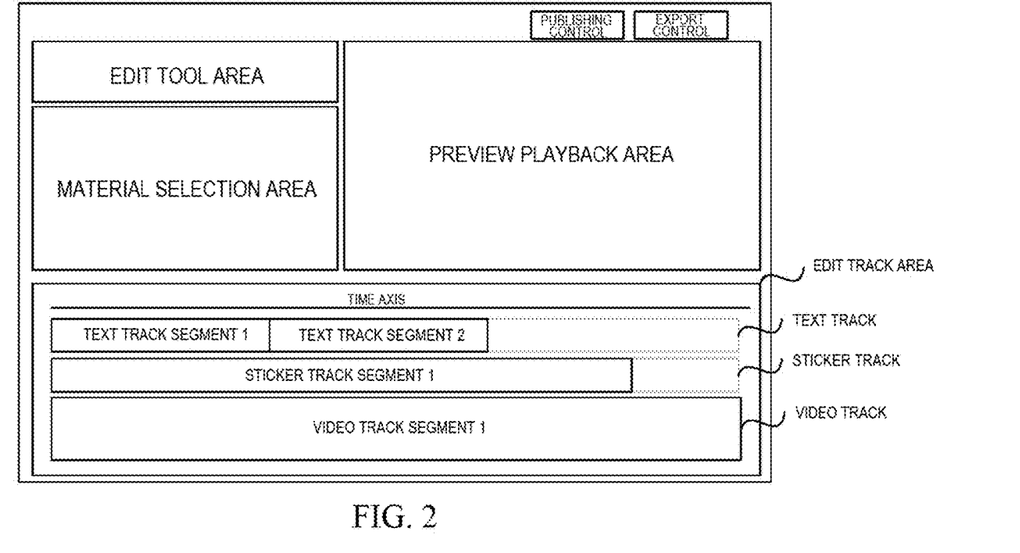
FIG. 2 is a schematic diagram of a draft edit interface provided by an embodiment of the present disclosure.

In practical applications, the template publishing interface can be presented under certain conditions, so that users can directly generate the required template based on the template publishing interface and further publish the template. For example, when a user (such as a template creator) triggers a control for presenting the template publishing interface, the template publishing interface is presented. In some specific implementation examples, in response to a trigger operation on a publishing control on a draft editing interface, it is judged whether the target video draft meets a preset publishing condition or not; if yes, the template publishing interface is presented based on the target video draft. The draft editing interface is used for the user to edit the target video draft, which comprises a material and editing information. The editing information is used for indicating an editing operation on the material, and the material may be, for example, images, videos, audios, text, stickers, special effects, etc., which are not limited here. For the sake of understanding, reference may be made to a schematic diagram of a draft editing interface shown in FIG. 2. The draft editing interface comprises a preview playback area, an edit track area, an edit tool area, a material selection area, etc. The preview playback area is used for presenting a video effect corresponding to the target video draft. The edit track area comprises a plurality of edit tracks. The material in the target video draft can have corresponding edit tracks, such as text tracks, sticker tracks, video tracks, etc., and form material track segments on the corresponding edit tracks. One track can have one or more material track segments, such as a text track segment 1 and a text track segment 2 on the text track, a sticker track segment 1 on the sticker track, and a video track segment 1 on the video track segment, as shown in FIG. 2. The edit tool area can include operation tools of a plurality of editing tools, such as a text edit control, a sticker edit control, an animation special effects control, etc. The edit tool area can also be divided into one or more sub-areas and distributed in different positions on the draft editing interface, which is not limited here. The material selection area helps users to directly select the materials to be added to the target video draft from local or cloud sources. FIG. 2 is merely a simple illustration. The layout of the above areas of the draft editing interface is not limited in the embodiments of the present disclosure, and more areas can be included, such as an attribute area. As illustrated in FIG. 2, a publishing control is presented on the draft editing interface, and in addition, other functional controls such as an export control can also be provided, which are not limited here. In order to ensure the smooth progress of template generation and publishing process, and to ensure that the templates published by users meet the requirements, in the embodiments of the present disclosure, only when it is determined that the target video draft meets the preset publishing condition, the template publishing interface will be presented and the subsequent template publishing process will be entered. In this template publishing process, a template needs to be generated first, and then the template is published to the designated platform. With the embodiments of the present disclosure, users can perform an operation on the target video draft directly on the template publishing interface, such as setting replaceable materials in the target video draft, etc., and templates are generated and published based on user operations.

As an example, the publishing condition includes one or more of the following conditions: all materials in the target video draft have been downloaded, all algorithms involved in the target video draft have been calculated, none of the materials in the target video draft has been lost or damaged, the main track corresponding to the target video draft is not empty, the target video draft does not contain specified content, the specified content may be such as materials with specified purposes, other templates, or specified keywords, etc., which are not limited here. Only when the above publishing conditions are met, the template publishing interface is presented for users to generate and publish target video templates based on the template publishing interface. In this way, the usability of subsequently published templates can be fully guaranteed.

Figure 3:
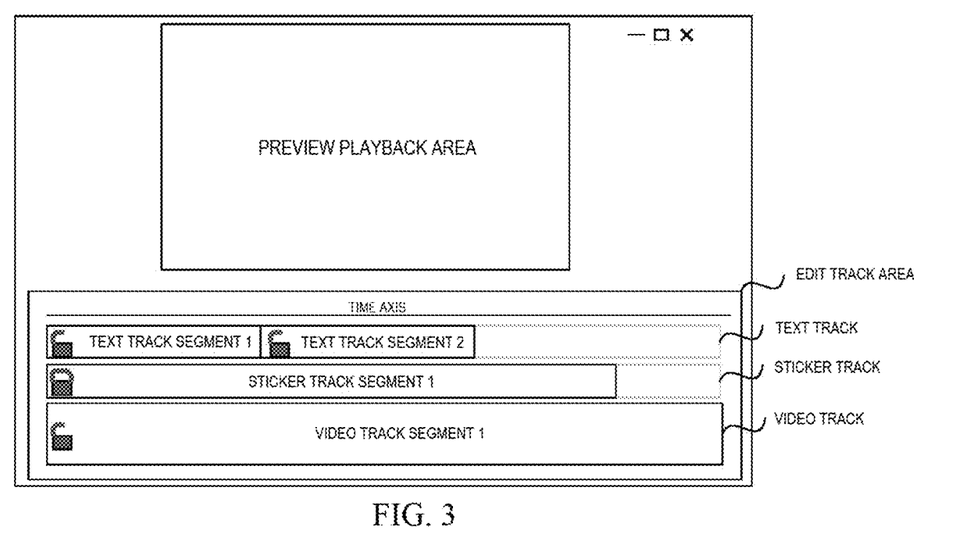
FIG. 3 is a schematic diagram of a template publishing interface provided by an embodiment of the present disclosure.

In some implementations, reference can be made to a schematic diagram of a template publishing interface shown in FIG. 3. The template publishing interface comprises a preview playback area and an edit track area. The edit track area contains a plurality of edit tracks. At least part of the materials of the target video draft have corresponding edit tracks among the plurality of edit tracks, and at least part of the materials form material track segments on the corresponding edit tracks. The number of edit tracks in the edit track area of the template publishing interface is less than or equal to the number of edit tracks in the edit track area of the draft editing interface. Specifically, some materials such as special effects and transitions are not replaceable by default due to their special nature, so the edit track of the material can be directly hidden. That is, the edit track area of the template publishing interface will not present the edit track of this type of material. By directly presenting the material track segment on the template publishing interface, it is not only convenient for users to clearly know the relationship between different materials, the position where the material appears, or the duration of continuous presentation, but also convenient for users to directly set the materials among existing materials that allow other users to replace based on the material track segment (i.e., replaceable materials).

Step S104: determining a replaceable material in the target video draft in response to a setting operation on a first target track segment in the material track segment.

In the embodiments of the present disclosure, users can directly set replaceable materials based on the material track segment presented on the template publishing interface. As an example, in order to facilitate user operation, a state identification control is provided on the material track segment, and users can set replaceable materials through the state identification control. Specifically, each material track segment is provided with a corresponding state identification control, and the state identification control has a replaceable state and a non-replaceable state. For example, as shown in FIG. 3, the lock on each material track segment represents the state identification control, being locked represents the non-replaceable state, and being unlocked represents the replaceable state. The user can perform a trigger operation on the state identification control by clicking the lock, thereby changing the state identification control. The material track segment where the user triggers the state identification control is the first target track segment, and the number of the first target track segments can be one or more, which is not limited here. For a certain material track segment, if the state identifier control thereon is the replaceable state, it means that the material corresponding to the material track segment is replaceable, otherwise it is non-replaceable. From the state of the state identification control on each material track segment, it is possible to determine quickly and reliably the replaceable material in the target video draft set by the user based on the material track segment.

Step S106: generating a target video template based on the target video draft and the replaceable material.

In some implementation examples, target operations can be performed on replaceable materials in the target video draft to obtain a target video template based on the target video draft after the target operation is performed. The target operations include: deleting operations or adding operations of replaceable identifiers. In other words, the target video template is generated based on the target video draft from which the replaceable material has been deleted, or is obtained by adding a replaceable identifier to the replaceable material in the target video draft. The target video template can be directly used by other users. For example, other users directly supplement their own materials in the target video template from which the replaceable material has been deleted, or use their own materials to replace materials added with replaceable identifiers in the target video template.

For ease of understanding, a detailed explanation is presented below to the target video template. The target video template is used to achieve the video editing effect of replacing replaceable materials with filled materials based on the target video draft. As an example, there are two ways to achieve the video editing effect of replacing replaceable materials with filled materials based on the target video draft. One way is to delete the replaceable material in the target video draft and use the target video draft from which the replaceable materials have been deleted as the target video template. Later, other users (i.e., template users) upload filled materials when using the target video template to obtain a resulting video draft containing the filled materials, in order to achieve the video editing effect of replacing replaceable materials with filled materials. The other way is to add replaceable identifiers to the replaceable materials in the target video draft and use the target video draft to which the replaceable identifiers have been added as the target video template. Later, other users upload filled materials when using the target video template, identify the replaceable materials based on the replaceable identifiers, and directly replace the replaceable materials with filled materials to obtain the resulting video draft containing the filled materials, in order to achieve the video editing effect of replacing replaceable materials with filled materials. Herein, the above-mentioned resulting video draft can be used to generate target videos after export and for further editing by users. The main difference between the resulting video draft obtained by the template user and the target video draft adopted by the template creator is that at least part of the materials are different. The resulting video draft contains filled materials, while the target video draft contains replaceable materials. For example, the target video draft includes material A, material B, and material C, among which material A is a replaceable material. By deleting or adding a replaceable identifier to material A in the target video draft, the target video template is obtained. The template user uploads material a (i.e. filled material) to the target video template, and the resulting video draft includes material a, material B, and material C. It is noteworthy that the editing information of the target video draft is the same as that of the resulting video draft, that is, the editing method of the material is the same. Therefore, the video effects formed by material A, material B, and material C are consistent with the video effects formed by material a, material B, and material C, except for the difference between material A and material a, presenting the user with the video editing effect of replacing material A by material a.

In addition, it is noteworthy that the template publishing interface can also provide users (template creators) with template cover settings and template title settings, and generate target video templates based on user-set template covers, template titles, target video drafts, and replaceable materials. Furthermore, advanced settings can be provided to users, such as whether to retain the original sound, whether to fully display the user's video, whether to allow intelligent modification to the number of template segments, etc., which is not limited here and can be flexibly set according to actual needs.

In practical applications, after generating the target video template, the target video template can also be published in response to receiving a publishing confirmation instruction for the target video template from the user.

For example, users may further be provided with a confirmation control. Upon detecting that the user triggers the confirmation control, it is confirmed that a publishing confirmation instruction for the target video template is received from the user, at which point the target video template can be published, e.g., publishing the target video template to a specified platform.

In this way, a template publishing interface that is more convenient for operation is provided to users. Users can directly set replaceable materials based on material track segments on a plurality of edit tracks, which is very convenient and fast, can better improve the template generation efficiency and further improve the template publishing efficiency.

On the basis of providing the material track segment with a state identification control, the embodiments of the present disclosure provide an implementation of determining the replaceable material in the target video draft in response to a setting operation on the first target track segment in the material track segment, with reference to the following steps A and B:

Step A: in response to a trigger operation on the state identification control on the first target track segment in the material track segment, determining a current state of the state identification control on each material track segment, the current state including a replaceable state and a non-replaceable state. That is, the user can change the state of the state identification control by triggering.

For ease of understanding, the embodiments of the present disclosure provide a specific implementation of step A. Specifically, in response to a trigger operation on the state identification control on the first target track segment in the material track segment, a current state of the state identification control on each material track segment is determined based on a state of the state identification control on the first target track segment before the trigger operation; the material track segment where the state identification control on which the trigger operation is performed is located is referred to as the first track segment, where the current state of the state identification control on the first target track segment is different from the state of the state identification control on the first target track segment before the trigger operation, and the current state of the state identification control on the non-first target track segment in the material track segment is the same as the state of the state identification control on the non-first target track segment before the trigger operation. The non-first target track segment is also other track segment than the first target track segment in the material track segment. In the above implementation, the user's trigger operation changes the state of the first track segment, and the state of the non-first target track segment remains unchanged. In practical applications, the user can directly click to trigger the state identifier control on a certain material track segment, thereby changing the state of the state identifier control. For example, if the state of the state identifier control is a non-replaceable state before the trigger operation, it will change to a replaceable state after the trigger operation; if the state of the state identifier control is a replaceable state before the trigger operation, it will change to a non-replaceable state after the trigger operation. The user can trigger the state identifier control one or more times according to needs, and the control state is changed once every time it is triggered. The initial state of the state identifier control can be a preset default state. For example, the initial default is a replaceable state and then is changed to a non-replaceable state after being triggered by the user.

In order to further simplify the user operation, in some implementations, the user can perform a multi-selection operation on the material track segment, i.e., the user can simultaneously select a plurality of material track segments, so that it is possible to set whether corresponding materials are replaceable for the plurality of material track segments. Based thereon, when performing step A, the embodiments of the present disclosure can determine a plurality of selected track segments from the material track segments corresponding to the multi-selection operation in response to the multi-selection operation on the material track segment; and determine a current state of the state identification control on each material track segment in response to the trigger operation on the state identification control on the first target track segment in the plurality of selected track segments; wherein the current state of the state identification control corresponding to each of the multiple selected track segments is consistent and different from the state of the state identification control on the first target track segment before the trigger operation; the current state of the state identification control on the non-selected track segment in the material track segment is the same as the state of the state identification control on the non-selected target track segment before the trigger operation. The non-selected track segment is the track segment in the material track segments other than the above-mentioned plurality of selected track segments, that is, the track segment that is not selected in the multi-selection operation. It is noteworthy that the above-mentioned trigger operation refers to the trigger operation of the user on the state identification on the first target track segment in the plurality of selected track segments. The user can first perform a multi-selection operation to simultaneously select a plurality of selected track segments in the plurality of material track segments, and then perform a trigger operation only on the state identification control on one (first target track segment) of the plurality of selected track segments. In this implementation, although only the state identification control of the first target track segment is triggered, the state of the state identification control of other selected track segments selected at the same time as the first target track segment can be changed at the same time. Specifically, the state of the state identification control of other selected track segments is consistent with the state of the state identification control after the change of state of the state identification control on the first target track segment. In other words, the current state of the state identifier control corresponding to each of the plurality of selected track segments is opposite to the state of the state identification control on the first target track segment before the trigger operation. In this manner, it is possible to efficiently set the states of the state identification controls of the plurality of material track segments.

For example, the user simultaneously selects the material track segments A, B, and C. Assuming that the state identification controls corresponding to the material track segments A and C are in a non-replaceable state, and the state identification control corresponding to the material track segment B is in a replaceable state, if the user triggers the state identification control of the material track segment A (that is, changes the state of the state identification control of the material track segment A), then the state identification controls of the material track segments A, B, and C are uniformly set to a replaceable state; if the user triggers the state identification control of the material track segment B (that is, changes the state of the state identification control of the material track segment B), the state identification controls of the material track segments A, B, and C are uniformly set to a non-replaceable state.

Step B: determining the replaceable material in the target video draft based on a second target track segment corresponding to the state identifier control that is currently in the replaceable state. That is, the material corresponding to the material track segment (i.e., the second target track segment) corresponding to the state identifier control that is currently in the replaceable state is the replaceable material. In this manner, it is possible to conveniently and quickly determine the replaceable material set by the user.

In order to facilitate the user to manipulate the state identification control, the method provided in the embodiments of the present disclosure further comprises: where it is detected that a third target track segment in the material track segments slides along a time axis, adjusting a position of a state identification control corresponding to the third target track segment, so that the state identification control corresponding to the third target track segment is located in a window corresponding to the third target track segment. In the embodiments of the present disclosure, the material track segment sliding along the time axis is called the third target track segment. It is noteworthy that the first target track segment, the second target track segment, and the third target track segment mentioned above in the embodiments of the present disclosure can be the same track segment or different track segments, and the respective number can be one or more, which is not limited here. It will be appreciated that the user might cause a certain material track segment (i.e., the third target track segment) to slide along the time axis according to needs, so as to quickly view or locate the presentation picture of a material (e.g., a video) at different times, but this situation might make it impossible for the material track segment to be fully displayed in the window. If the relative position of the state identification control and the material track segment is fixed, it might make it impossible for the state identification control to appear in the window as the material track segment slides, and thus the user operation is inconvenient. In this view, with the embodiments of the present disclosure, in the case of detecting the third target track segment slides along the time axis, the position of the state identification control corresponding to the third target track segment can be flexibly adjusted to ensure that its state identification control can always be located within the window corresponding to the third target track segment, so that the user can always see the state identification control on the third target track segment, and trigger it when needed to conveniently change the state identification control.

Figure 4A:
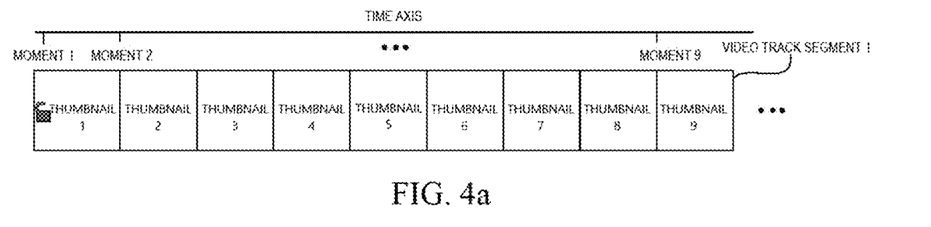
FIG. 4a is a schematic diagram of a relative position relationship between a state identification control and a video track segment provided by an embodiment of the present disclosure.
Figure 4B:
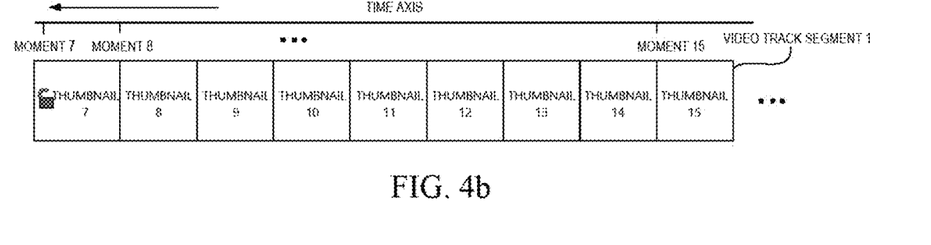
FIG. 4b is a schematic diagram of a relative positional relationship between a state identification control and a video track segment provided by an embodiment of the present disclosure.

For ease of understanding, reference may be made to a schematic diagram of the relative position relationship between a state identification control and a video track segment shown in FIGS. 4a and 4b respectively. It will be appreciated that a video track segment can present a plurality of thumbnails of a video in chronological order to the user, and thumbnails can specifically be thumbnails of a video key frame. The state identification control (lock) in FIG. 4a is located at the position of thumbnail 1. If the video track segment slides along the time axis, the thumbnails in the window of the video track segment will also change. As shown in FIG. 4a, the user can see thumbnails 1 to 9 through the window of the video track segment at the same time. When the video track segment slides along the time axis, as shown in FIG. 4b, as time changes, the user can see thumbnails 7 to 15 through the window of the video track segment at the same time, and thumbnails 1 to 6 are no longer displayed in the window. If the relative position of the video track segment and its corresponding state identification control remains unchanged, the state identification control will also be invisible as thumbnail 1 moves out of the window. If the user wants to trigger the state identification control, he/she needs to slide the video track segment in the opposite direction, which is rather cumbersome. Therefore, the embodiments of the present disclosure can dynamically adjust the position of the state identification control corresponding to the material track segment as the material track segment slides along the time axis, so that the state identification control is always visible when the material track segment exists. Even if the user slides the material track segment, he/she can easily and quickly trigger the state identification control according to needs without returning to find the state identification control, which can better guarantee the user experience.

In summary, the method for video editing provided in the embodiments of the present disclosure directly presents a plurality of edit tracks on the template publishing interface and allows the user to set the replaceable material directly based on the track segment material. Thus, great convenience is provided for users, and they can quickly know the situation of the current material and select a replaceable material, which is very convenient and fast and can better improve the efficiency of template generation and publishing.

Figure 5:
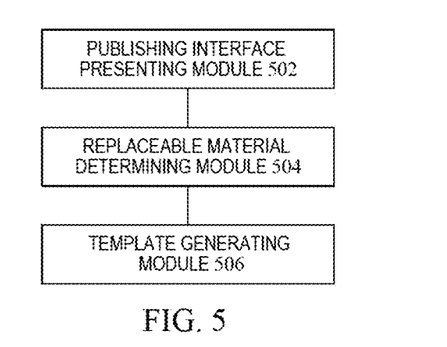
FIG. 5 is a schematic structural diagram of an apparatus for video editing provided by an embodiment of the present disclosure.

Corresponding to the method for publishing the video template, FIG. 5 is a schematic structural diagram of an apparatus for video editing according to embodiments of the present disclosure, the apparatus may be implemented by software and/or hardware, generally integrated in an electronic device. As shown in FIG. 5, the apparatus 500 for video editing comprises:

a publishing interface presenting module 502, for presenting a template publishing interface based on a target video draft; wherein the template publishing interface comprises an edit track area, the edit track area comprises a plurality of edit tracks, and material track segments formed based on at least part of a material of the target video draft are presented on the plurality of edit tracks; the target video draft comprises a material and edit operation information corresponding to the material;

a replaceable material determining module 504, for determining a replaceable material in the target video draft in response to a setting operation on a first target track segment in the material track segments;

a template generating module 506, for generating a target video template based on the target video draft and the replaceable material; wherein the target video template is used to achieve a video editing effect of replacing a replaceable material with a filled material based on the target video draft.

With the above apparatus, a more friendly interface provided to the users for template publishing is, and users can directly set replaceable materials based on material track segments on the multiple edit tracks. It is very convenient and fast, and can better improve the efficiency of template generation, further helping to improve the efficiency of template publishing.

In some embodiments, a state identifier control is provided on the material track segment; the replaceable material determining module 504 is specifically configured for: in response to a trigger operation on a state identification control on a first target track segment in the material track segments, determining a current state of a state identification control on each of the material track segments, the current state comprising a replaceable state or non-replaceable state; and determining a replaceable material in the target video draft based on a second target track segment corresponding to a state identification control that is currently in a replaceable state.

In some embodiments, the apparatus further comprises a control position adjusting module for, where it is detected that a third target track segment in the material track segments slides along a time axis, adjusting a position of a state identification control corresponding to the third target track segment, so that the state identification control corresponding to the third target track segment is located within a window corresponding to the third target track segment.

In some embodiments, the replaceable material determining module 504 is specifically configured for, in response to a trigger operation on a state identification control on a first target track segment in the material track segments, determining a current state of a state identification control on each of the material track segments based on a state of the state identification control on the first target track segment before the trigger operation; wherein the current state of the state identification control on the first target track segment is different from the state of the state identification control on the first target track segment before the trigger operation, and a current state of a state identification control on a non-first target track segment in the material track segments is the same as a state of the state identification control on the non-first target track segment before the trigger operation.

In some embodiments, the replaceable material determining module 504 is specifically configured for, in response to a multi-selection operation on the material track segments, determining a plurality of selected track segments corresponding to the multi-selection operation from the material track segments; in response to a trigger operation on a state identification control on a first target track segment in the plurality of selected track segments, determining a current state of a state identification control on each of the material track segments; wherein the current state of the state identification control corresponding to each of the plurality of selected track segments remains consistent, and is different from a state of a state identification control on the first target track segment before the trigger operation; a current state of a state identification control on a non-selected track segment in the material track segments is the same as a state of the state identification control on the non-selected target track segment before the trigger operation.

In some embodiments, the publishing interface presenting module 502 is configured for, in response to a trigger operation on a publishing control on a draft edit interface, determining whether a target video draft meets a preset publishing condition or not; if yes, presenting a template publishing interface based on the target video draft.

In some embodiments, the publishing condition comprises one or more of the following conditions: all materials in the target video draft have been downloaded, all algorithms involved in the target video draft have been calculated, none of materials in the target video draft has been lost or damaged, a main track corresponding to the target video draft is not empty, and the target video draft does not contain a specified content.

In some embodiments, the template generating module 506 is specifically configured for, performing a target operation on a replaceable material in the target video draft to obtain a target video template based on the target video draft after the target operation is performed; wherein the target operation comprises: a delete operation or an adding operation of a replaceable identifier.

In some embodiments, the apparatus further comprises: a template publishing module, for publishing the target video template in response to receiving a publishing confirmation instruction for the target video template from a user.

The apparatus for video editing provided by embodiments of the present disclosure may perform the method for video editing according to any embodiment of the present disclosure, and includes functional modules corresponding to the method and has and beneficial effects.

Those skilled in the art will clearly understand that, for convenience and brevity of description, reference may be referred to the corresponding process in the method embodiment for the specific working process of the apparatus embodiment described above, which will not be repeated here.

Embodiments of the present disclosure provides an electronic device, the electronic device comprising: a storage device having a computer program stored thereon; a processing device for executing the computer program in the storage device, to implement steps in any of the method of the present disclosure.

Figure 6:
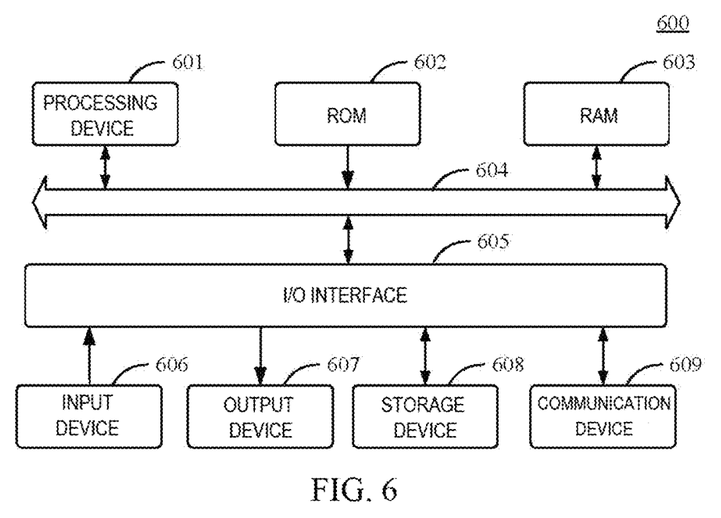
FIG. 6 is a schematic structural embodiment of an electronic device provided by an embodiment of the present disclosure.

Referring now to FIG. 6, it shows a schematic structural diagram of an electronic device 600 suitable for implementing embodiments of the present disclosure. Terminal devices in embodiments of the present disclosure may include, but are not limited to, mobile terminals such as mobile phones, notebook computers, digital broadcast receivers, PDAs (personal digital assistants), PADs (tablets), PMPs (portable multimedia players), car end points (such as car navigation end points), etc., as well as fixed end points such as digital TVs, desktop computers, etc. The electronic device shown in FIG. 6 is merely an example and should not bring any limitation to the functionality and scope of use of embodiments of the present disclosure.

As shown in FIG. 6, the electronic device 600 may include a processing device (such as a central processing unit, graphics processing unit, etc.) 601, which can perform various appropriate actions and processes based on programs stored in read-only memory (ROM) 602 or loaded from storage device 608 into random access memory (RAM) 603. In RAM 603, various programs and data required for the operation of the electronic device 600 are also stored. The processing device 601, ROM 602, and RAM 603 are connected to each other through a bus 604. The input/output (I/O) interface 605 is also connected to the bus 604.

Typically, the following devices can be connected to the I/O interface 605: an input device 606 including, for example, a touchscreen, touchpad, keyboard, mouse, camera, microphone, accelerometer, gyroscope, etc.; an output device 607 including, for example, a liquid crystal display (LCD), speaker, vibrator, etc.; a storage device 608 including, for example, magnetic tape, hard disk, etc.; and a communication device 609. The communication device 609 may allow the electronic device 600 to communicate wirelessly or wirelessly with other devices to exchange data. Although FIG. 6 shows an electronic device 600 having various devices, it should be understood that it is not required to implement or have all of the devices shown. More or fewer devices may alternatively be implemented or have.

In particular, according to embodiments of the present disclosure, the above process described with reference to the flowchart can be implemented as a computer software program. For example, embodiments of the present disclosure include a computer program product that includes a computer program carried on a non-transitory computer-readable medium, the computer program containing program code for performing the method shown in the flowchart. In such embodiments, the computer program can be downloaded from the network and installed through the communication device 609, or from the storage device 608, or from the ROM 602. When the computer program is executed by the processing device 601, the above-described functions defined in the embodiments of the present disclosure are performed.

In addition to the methods and apparatus described above, embodiments of the present disclosure may also be a computer program product comprising computer program instructions that, when executed by a processor, cause the processor to perform the video editing method provided in the embodiments of the present disclosure. The computer program product may be written in any combination of one or more programming languages, including object oriented programming languages such as Java, C++, etc., as well as conventional procedural programming languages such as "C" language or similar programming languages. The program code may be executed entirely on the user computing device, partially on the user device, as a standalone software package, partially on a remote computing device, or entirely on a remote computing device or server.

Further, embodiments of the present disclosure may also be a computer-readable storage medium having stored thereon computer program instructions, the computer program instructions cause the processor to perform video editing embodiments of the present disclosure provided when executed by the processor method.

The computer-readable storage medium can use any combination of one or more readable media. The readable medium can be a readable signal medium or a readable storage medium. The readable storage medium can include, but is not limited to, electrical, magnetic, optical, electromagnetic, infrared, or semiconductor systems, devices, or any combination thereof. More specific examples of readable storage media (non-exhaustive list) include: electrical connections with one or more wires, portable disks, hard disks, random access memory (RAM), read-only memory (ROM), erasable programmable read-only memory (EPROM or flash memory), optical fibers, portable compact disc read-only memory (CD-ROM), optical storage devices, magnetic storage devices, or any suitable combination thereof.

Embodiments of the present disclosure also provides a computer program product, comprising a computer program/instructions, the computer program/instructions implemented video editing method embodiments of the present disclosure when executed by a processor.

It will be appreciated that, before using the technical solutions disclosed in each embodiment of the present disclosure, the user should be informed of the type of personal information involved in the present disclosure, the scope of use, the use scenario, etc. in an appropriate manner in accordance with relevant laws and regulations, and authorized by the user.

For example, in response to receiving an active request from a user, a prompt message is sent to the user to explicitly notify the user that the requested operation will require obtaining and using the user's personal information. Therefore, the user can autonomously choose whether to provide the personal information to software or hardware such as electronic devices, applications, servers, or storage media that perform operations of the disclosed technical solution based on the prompt message.

As an optional but non-limiting implementation, in response to receiving an active request from a user, a prompt message may be sent to the user, for example, in the form of a pop-up window, in which the prompt message may be presented in the form of text. In addition, the pop-up window may also carry a selection control for the user to choose "agree" or "disagree" to provide personal information to the electronic device.

It will be appreciated that the above-described notifying and user authorization obtaining process is merely illustrative, not limiting the implementation of the present disclosure, other ways to meet relevant laws and regulations may also be applied to the implementation of the present disclosure.

It should be noted that in this disclosure, relational terms such as "the first" and "the second" are only used to distinguish one entity or operation from another entity or operation, and do not necessarily require or imply any actual relationship or order between these entities or operations. Moreover, the terms "including", "comprising", or any other variant thereof are intended to cover non-exclusive inclusion, so that a process, method, article, or device that includes a series of elements not only includes those elements, but also includes other elements not explicitly listed, or includes elements inherent to such a process, method, article, or device. In the absence of further limitations, the element defined by the sentence "including a . . . " does not exclude the existence of additional identical elements in the process, method, article, or device that includes the element.

The above is only a detailed description of the present disclosure, which enables those skilled in the art to understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to these embodiments described herein, but will conform to the widest scope consistent with the principles and novel features disclosed herein.

What is claimed is:

1. A method for video editing, comprising:
   presenting a template publishing interface based on a target video draft; wherein the template publishing interface comprises an edit track area, the edit track area comprises a plurality of edit tracks, and material track segments formed based on at least part of a material of the target video draft are presented on the plurality of edit tracks; the target video draft comprises a material and edit information, the edit information indicates an edit operation on the material;
   providing a state identification control corresponding to each of the material track segments;
   determining a current state of a state identification control corresponding to a first target track segment in the material track segments in response to a trigger operation on the state identification control corresponding to the first target track segment;
   identifying a material corresponding to the first target track segment as a replaceable material in the target video draft in response to determining that the current state of the state identification control corresponding to the first target track segment is a replaceable state; and
   generating a target video template based on the target video draft and the replaceable material, wherein the target video template is configured to achieve a video editing effect of replacing the replaceable material with a filled material.

2. The method of claim 1, further comprising:
   in response to a detection that a third target track segment in the material track segments slides along a time axis, adjusting a position of a state identification control corresponding to the third target track segment, so that the state identification control corresponding to the third target track segment is located within a window corresponding to the third target track segment.

3. The method of claim 1, wherein the method further comprises:
   in response to a multi-selection operation on the material track segments, determining a plurality of selected track segments corresponding to the multi-selection operation from the material track segments; and
   wherein a current state of the state identification control corresponding to each of the plurality of selected track segments is different from a state of the state identification control corresponding to each of the plurality of selected track segments before the multi-selection operation, and wherein a current state of a state identification control corresponding to a non-selected track segment in the material track segments is the same as a state of the state identification control corresponding to the non-selected target track segment before the multi-selection operation.

4. The method of claim 1, wherein presenting a template publishing interface based on a target video draft comprises:
   in response to a trigger operation on a publishing control on a draft edit interface, determining whether a target video draft meets a preset publishing condition or not; and
   in response to a determination that the target video draft meets the preset publishing condition, presenting a template publishing interface based on the target video draft.

5. The method of claim 4, wherein publishing condition comprises one or more of the following conditions: all materials in the target video draft have been downloaded, all algorithms involved in the target video draft have been calculated, none of materials in the target video draft has been lost or damaged, a main track corresponding to the target video draft is not empty, and the target video draft does not contain a specified content.

6. The method of claim 1, wherein the generating the target video template based on the target video draft and the replaceable material comprises:
   performing a target operation on the replaceable material in the target video draft to obtain the target video template based on the target video draft after the target operation is performed, wherein the target operation comprises an operation of deleting the replaceable material from the target video draft or an operation of adding a replaceable identifier to the replaceable material.

7. The method of claim 1, further comprising:
publishing the target video template in response to receiving a publishing confirmation instruction for the target video template from a user.

8. An electronic device, comprising:
a storage unit, having a computer program stored thereon;
a processing unit, for executing the computer program in the storage unit to perform operations comprising:
presenting a template publishing interface based on a target video draft; wherein the template publishing interface comprises an edit track area, the edit track area comprises a plurality of edit tracks, and material track segments formed based on at least part of a material of the target video draft are presented on the plurality of edit tracks; the target video draft comprises a material and edit information, the edit information indicates an edit operation on the material;
providing a state identifier control corresponding to each of the material track segments;
determining a current state of a state identifier control corresponding to a first target track segment in the material track segments in response to a trigger operation on the state identifier control corresponding to the first target track segment;
identifying a material corresponding to the first target track segment as a replaceable material in the target video draft in response to determining that the current state of the state identifier control corresponding to the first target track segment is a replaceable state; and
generating a target video template based on the target video draft and the replaceable material, wherein the target video template is configured to achieve a video editing effect of replacing the replaceable material with a filled material.

9. The device of claim 8, wherein the operations further comprise:
in response to a detection that a third target track segment in the material track segments slides along a time axis, adjusting a position of a state identification control corresponding to the third target track segment, so that the state identification control corresponding to the third target track segment is located within a window corresponding to the third target track segment.

10. The device of claim 8, wherein the operations further comprise:
in response to a multi-selection operation on the material track segments, determining a plurality of selected track segments corresponding to the multi-selection operation from the material track segments; and
wherein a current state of the state identification control corresponding to each of the plurality of selected track segments is different from a state of the state identification control corresponding to each of the plurality of selected track segments before the multi-selection operation, and wherein a current state of a state identification control corresponding to a non-selected track segment in the material track segments is the same as a state of the state identification control corresponding to the non-selected target track segment before the multi-selection operation.

11. The device of claim 8, wherein presenting a template publishing interface based on a target video draft comprises:
in response to a trigger operation on a publishing control on a draft edit interface, determining whether a target video draft meets a preset publishing condition or not; and
in response to a determination that the target video draft meets the preset publishing condition, presenting a template publishing interface based on the target video draft.

12. The device of claim 11, wherein publishing condition comprises one or more of the following conditions: all materials in the target video draft have been downloaded, all algorithms involved in the target video draft have been calculated, none of materials in the target video draft has been lost or damaged, a main track corresponding to the target video draft is not empty, and the target video draft does not contain a specified content.

13. The device of claim 8, wherein generating the target video template based on the target video draft and the replaceable material comprises:
performing a target operation on the replaceable material in the target video draft to obtain the target video template based on the target video draft after the target operation is performed, wherein the target operation comprises an operation of deleting the replaceable material from the target video draft or an operation of adding a replaceable identifier to the replaceable material.

14. The device of claim 8, wherein the operations further comprise:
publishing the target video template in response to receiving a publishing confirmation instruction for the target video template from a user.

15. A non-transitory computer-readable medium, storing a computer program which, when executed by a processing unit, causes the processing unit to perform operations comprising:
presenting a template publishing interface based on a target video draft; wherein the template publishing interface comprises an edit track area, the edit track area comprises a plurality of edit tracks, and material track segments formed based on at least part of a material of the target video draft are presented on the plurality of edit tracks; the target video draft comprises a material and edit information, the edit information indicates an edit operation on the material;
providing a state identifier control corresponding to each of the material track segments;
determining a current state of a state identifier control corresponding to a first target track segment in the material track segments in response to a trigger operation on the state identifier control corresponding to the first target track segment;
identifying a material corresponding to the first target track segment as a replaceable material in the target video draft in response to determining that the current state of the state identifier control corresponding to the first target track segment is a replaceable state; and
generating a target video template based on the target video draft and the replaceable material, wherein the target video template is configured to achieve a video editing effect of replacing the replaceable material with a filled material.

16. The non-transitory computer-readable medium of claim 15, the operations further comprising:
in response to a detection that a third target track segment in the material track segments slides along a time axis, adjusting a position of a state identification control corresponding to the third target track segment, so that the state identification control corresponding to the third target track segment is located within a window corresponding to the third target track segment.

17. The non-transitory computer-readable medium of claim 15, the operations further comprising:
   in response to a multi-selection operation on the material track segments, determining a plurality of selected track segments corresponding to the multi-selection operation from the material track segments; and
   wherein a current state of the state identification control corresponding to each of the plurality of selected track segments is different from a state of the state identification control corresponding to each of the plurality of selected track segments before the multi-selection operation, and wherein a current state of a state identification control corresponding to a non-selected track segment in the material track segments is the same as a state of the state identification control corresponding to the non-selected target track segment before the multi-selection operation.

18. The non-transitory computer-readable medium of claim 15, wherein the presenting a template publishing interface based on a target video draft comprises:
   in response to a trigger operation on a publishing control on a draft edit interface, determining whether a target video draft meets a preset publishing condition or not; and
   in response to a determination that the target video draft meets the preset publishing condition, presenting a template publishing interface based on the target video draft.

19. The non-transitory computer-readable medium of claim 15, wherein the generating a target video template based on the target video draft and the replaceable material comprises:
   performing a target operation on the replaceable material in the target video draft to obtain the target video template after the target operation is performed, wherein the target operation comprises an operation of deleting the replaceable material from the target video draft or an operation of adding a replaceable identifier to the replacement material.

20. The non-transitory computer-readable medium of claim 15, the operations further comprising:
   publishing the target video template in response to receiving a publishing confirmation instruction for the target video template from a user.

* * * * *